(12) United States Patent
Gupta et al.

(10) Patent No.: US 9,195,713 B2
(45) Date of Patent: Nov. 24, 2015

(54) OUTLIER DATA POINT DETECTION

(75) Inventors: Chetan Kumar Gupta, Austin, TX (US); Song Wang, Austin, TX (US); Abhay Mehta, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1429 days.

(21) Appl. No.: 12/614,432

(22) Filed: Nov. 8, 2009

(65) Prior Publication Data

US 2011/0113009 A1     May 12, 2011

(51) Int. Cl.
    *G06F 7/00*     (2006.01)
    *G06F 17/00*     (2006.01)
    *G06F 17/30*     (2006.01)

(52) U.S. Cl.
    CPC .................................. *G06F 17/30516* (2013.01)

(58) Field of Classification Search
    CPC ................................................. G06F 17/30516
    USPC .............. 707/1, 245, 748, 713; 719/313, 315, 719/328; 706/45
    See application file for complete search history.

(56) References Cited

U.S. PATENT DOCUMENTS

| 7,353,218 | B2 * | 4/2008 | Aggarwal et al. | ..................... 1/1 |
| 7,424,489 | B1 * | 9/2008 | Duffield et al. | ....................... 1/1 |
| 7,937,269 | B2 * | 5/2011 | Aggarwal et al. | ............. 704/245 |
| 7,970,772 | B2 * | 6/2011 | Aggarwal et al. | ............. 707/748 |
| 2008/0301135 | A1 * | 12/2008 | Alves et al. | ........................ 707/6 |

OTHER PUBLICATIONS

C.C. Aggarwal et al., "A framework for projected clustering of high dimensional data streams," Procs. of 30th VLDB Conf., 2004.
Chandola et al., "Outlier detection: A survey," Univ. of Minnesota Technical Report, 2007.
Gupta et al., "Outlier detection with streaming dyadic decomposition," Industrial Conf. on Data Mining, 2007.
Jagadish et al., "Mining deviants in a time series data base," Procs. of Int'l Conf. on Very Large Databases, 1999.
Knorr et al., "Algorithms for mining distance based outliers in large datasets," Procs. of Int'l Conf. on Very Large Databases, 1998.
S. Muthukrishnan et al., "Mining deviants in time series data streams," Technical Report DIMACS TR 2003-43, year 2003.
S. Ramaswamy et al., "Efficient algorithms for mining outliers from large datasets," Procs. of ACM Int'l Conf. Management of Data, 2000.

* cited by examiner

*Primary Examiner* — Susan Chen
(74) *Attorney, Agent, or Firm* — Hewlett-Packard Patent Department (57) ABSTRACT

New data points are added to a streaming window of data points and existing data points are removed from the window over time. Each data point has a value for each of one or more dimensions. Each time a given new data point is added to the window or a given existing data point is removed from the window, one or more outlier detection data structures are updated. Each outlier detection data structure encompasses the data points within the streaming window for a corresponding dimension. The outlier detection data structures are used to detect outlier data points within the window over selected one or more dimensions.

15 Claims, 6 Drawing Sheets

OUTLIER DATA POINT DETECTION

BACKGROUND

An outlier data point is a data point that is distant from other data points. That is, an outlier data point is a data point that deviates markedly from other data points of the sample in which it occurs. Outlier data point detection is used in a variety of different real world situations. For example, credit card transactions may be analyzed for outliers that correspond to fraudulent transactions. As another example, in the management of operations in which a large number of events can occur, it can be important to detect a problem—i.e., an outlier—relatively quickly so that appropriate corrective action can be taken. Other examples of real world situations in which outlier data point detection can be useful include, equipment monitoring and data center management, among other types of real world situations.

DETAILED DESCRIPTION

As noted in the background section, outlier data point detection is used in a variety of different real world situations. In many of these real world situations, there is a streaming window of data points over which outliers are to be detected. In a streaming window of data points, new data points are constantly added to the streaming window and existing data points are constantly removed from the streaming window.

Outlier data point detection within a streaming window of data points is particularly difficult. First, to the extent that any data structures are used to detect such outliers, it may be impractical to recreate the data structures each time a new data point is added to the streaming window or an existing data point is removed from the streaming window. That is, there may be insufficient processing power to timely regenerate the data structures anew to take into account just the data points that are currently within the streaming window.

For example, some types of existing outlier data point detection techniques determine the distances between each data point and every other data point to detect outlier data points. In these types of existing techniques, when a new data point is added to a streaming window or an existing data point is removed from the streaming window, these distances have to be recalculated. The amount of processing power to timely perform this recalculation may be prohibitive.

Second, to the extent that each data point has a value for each of a number of dimensions, it may be impractical to maintain a data structure used to detect such outliers for each unique combination of these dimensions. For example, each data point may have a unique value over four dimensions, such as temperature, humidity, wind speed, and precipitation in the context of a weather station. Outliers may have to be detected as to each unique combination of one or more of these dimensions, such as just temperature, temperature combined with humidity, humidity combined with wind speed and precipitation, and so on. If a different data structure has to be maintained for each of these unique combinations, then a total of fifteen data structures have to be maintained.

In general, if a different data structure has to be maintained for each unique combination of one or more of n dimensions, then the total number of data structures that has to be maintained is $$\sum_{k=1}^{n} \frac{n!}{k!(n-k)!}.$$

In this equation, $$\frac{n!}{k!(n-k)!}$$

is the number of combinations of k dimensions for $0 \leq k \leq n$, the operator "!" denotes the factorial such that n! is the factorial of n, and the factorial of zero (i.e., 0!) is defined as one. Therefore, for data points that have values for a large number of dimensions, maintaining a different data structure for each unique combination of one or more of these dimensions quickly becomes prohibitive from a storage perspective and/or a processing power perspective.

The inventors have developed an approach to detect outliers within a streaming window of data points that overcomes these difficulties by using a novel outlier detection data structure that has at least two characteristics. First, when a new data point is added to the streaming window or an existing data point is removed from the streaming window, a set of outlier data points can be updated by analyzing the outlier detection data structure in relation to just some, and not all, of the data points within the streaming window. To update the set of outlier data points when a new data point is added to the streaming window, the outlier detection data structure is analyzed just in relation to the new data point and to its neighbor data points within the streaming window, and not to any other data point within the window. To update the set of outlier data points when an expiring data point is removed from the streaming window, the outlier detection data structure is analyzed just in relation to the expiring data point and to the data points that were its neighbor data points prior to removal of the expiring data point, and not to any other data point within the window. Therefore, less processing power is used to update a set of outlier data points, via the disclosed outlier detection data structures.

Second, a different outlier detection data structure just has to be maintained for each dimension, and not for each unique combination of one or more of the dimensions. For example, if each data point within the streaming window has a value for each of n dimensions, then just n outlier detection data structures have to be maintained, instead of $$\sum_{k=1}^{n} \frac{n!}{k!(n-k)!}$$

outlier detection data structures. Therefore, less storage space as well as less processing power is used to maintain the disclosed outlier detection data structures.

The following description of the invented approach to detect outliers within a streaming window of data points is presented in relation to a method for performing outlier data point detection. The method is in turn explained in relation to a representative example of a streaming window of data points. The method is further explained in relation to a representative example outlier data detection structure that can have either or both of the characteristics noted above.

Figure 1:
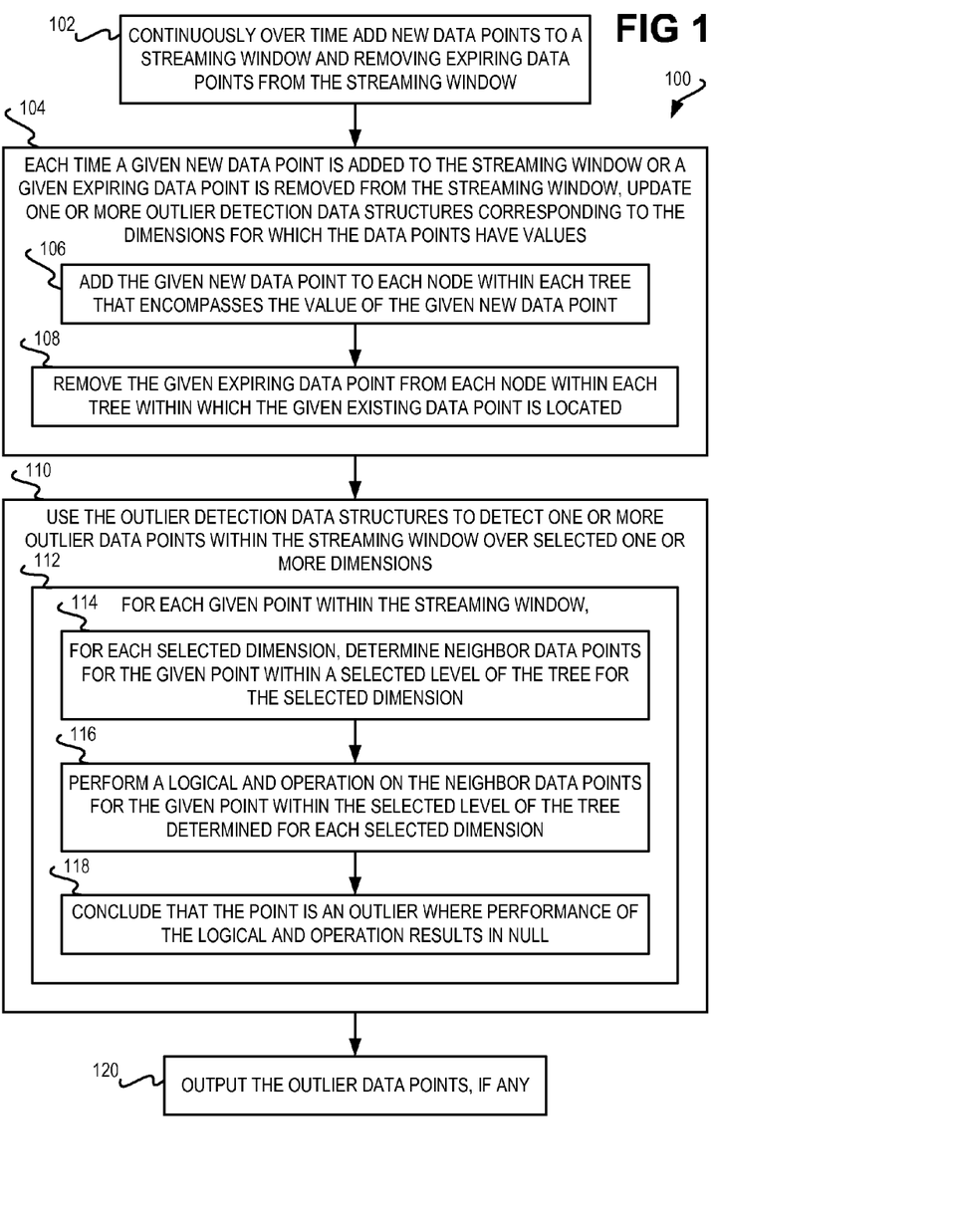
FIG. 1 is a flowchart for detecting outlier data points, according to an embodiment of the present disclosure.

FIG. 1 thus shows a method 100 for outlier data point detection, according to an embodiment of the disclosure. New data points are added to a streaming window of data points and expiring data points are removed from the streaming window of data points over time (102), such as continuously over time. In one embodiment, a given streaming window may have at any given time x data points. When a new data point is added to the streaming window, the oldest expiring data point may be removed from the streaming window.

An expiring data point is an existing data point within the streaming window that is to be removed from the streaming window. For example, in one embodiment, if a streaming window has at any given time x data points, when a new data point is added to the streaming window, an existing data point has to be removed from the window so that the streaming window has x data points and not x+1 data points. The existing data point that is removed in this case is an expiring data point.

Figure 2:
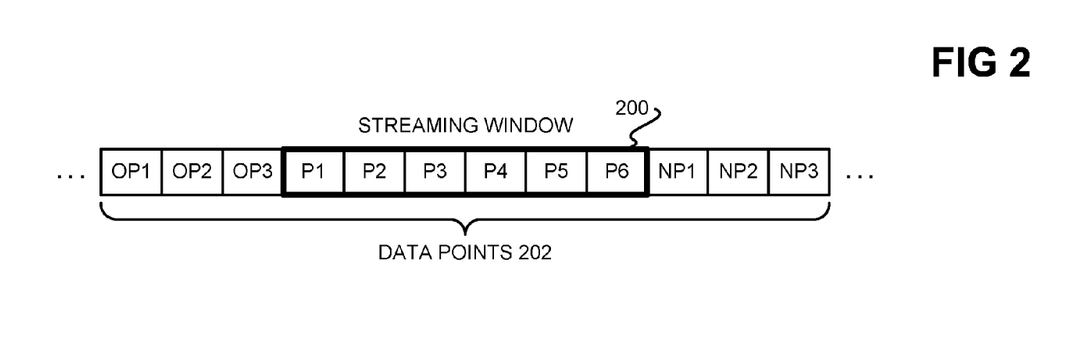
FIG. 2 is a diagram of an exemplary streaming data window, according to an embodiment of the present disclosure.

FIG. 2 shows an exemplary streaming window 200, according to an embodiment of the disclosure. There are data points 202. At the instant of time t depicted in FIG. 2, the streaming window 200 encompasses data points P1, P2, P3, P4, P5, and P6. In past times t−1, t−2, and t−3, the streaming window 200 encompassed data points OP1, OP2, and OP3. In future times t+1, t+2, and t+3, the streaming window will encompass data points NP1, NP2, and NP3.

For example, at time t−3, the streaming window 200 encompassed data points OP1, OP2, OP3, P1, P2, and P3. At time t−2, data point P4 was added, and data point OP1 was removed. At time t−1, data point P5 was added, and data point OP2 was removed. At time t, then, data point P6 was added, and data point OP3 was removed. At time t+1, data point NP1 will be added, and data point P1 will be removed. At time t+2, data point NP2 will be added, and data point P2 will be removed. At time t+3, data point NP3 will be added, and data point P3 will be removed.

Figure 3:
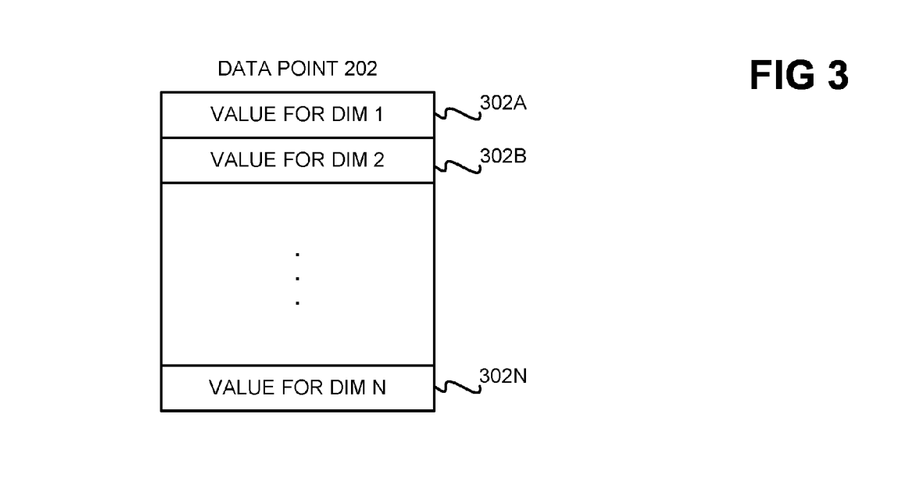
FIG. 3 is a diagram of an exemplary data point, according to an embodiment of the present disclosure.

FIG. 3 shows an exemplary data point 202 in detail, according to an embodiment of the disclosure. The data point 202 has a number of values 302A, 3028, . . . , 302N, collectively referred to as the values 302. The values 302 correspond to a number of dimensions for which each data point 202 has values. Therefore, the data point 202 has the value 302A for dimension one, the value 302B for dimension two, and the value 302N for dimension n, where there are n total dimensions for which each data point 202 has values.

For example, for a weather station, each data point may correspond to data that is collected for each point in time. The data that is collected may include temperature, humidity, wind speed, and precipitation. Therefore, in this example, there are four dimensions: temperature, humidity, wind speed, and precipitation. Each data point has a value for temperature, a value for humidity, a value for wind speed, and a value for precipitation.

It is noted that in other embodiments, the streaming window may not have a constant number of data points. For example, a streaming window may correspond to a certain range of time, and may contain a variable number of data points corresponding to the number of data points receiving within that range of time. For instance, a streaming window may correspond to the range of time t−s through t, where t is the current time, and where s is the length or size (in time units) of the window. Thus, at any given time t, the streaming window includes the data points that were received in this range of time t−s through t.

Referring back to FIG. 1, each time a given new data point is added to the streaming window, or a given existing data point (i.e., an expiring data point) is removed from the streaming window, one or more outlier detection data structures corresponding to the dimensions for which the data points have values are updated (104). There is an outlier detection data structure for each dimension, and each data structure corresponds to a unique dimension. The outlier detection data structures are updated by adding just the given new data point to the outlier data structures, or by removing just the given existing data point from the outlier data structures.

Figure 4:
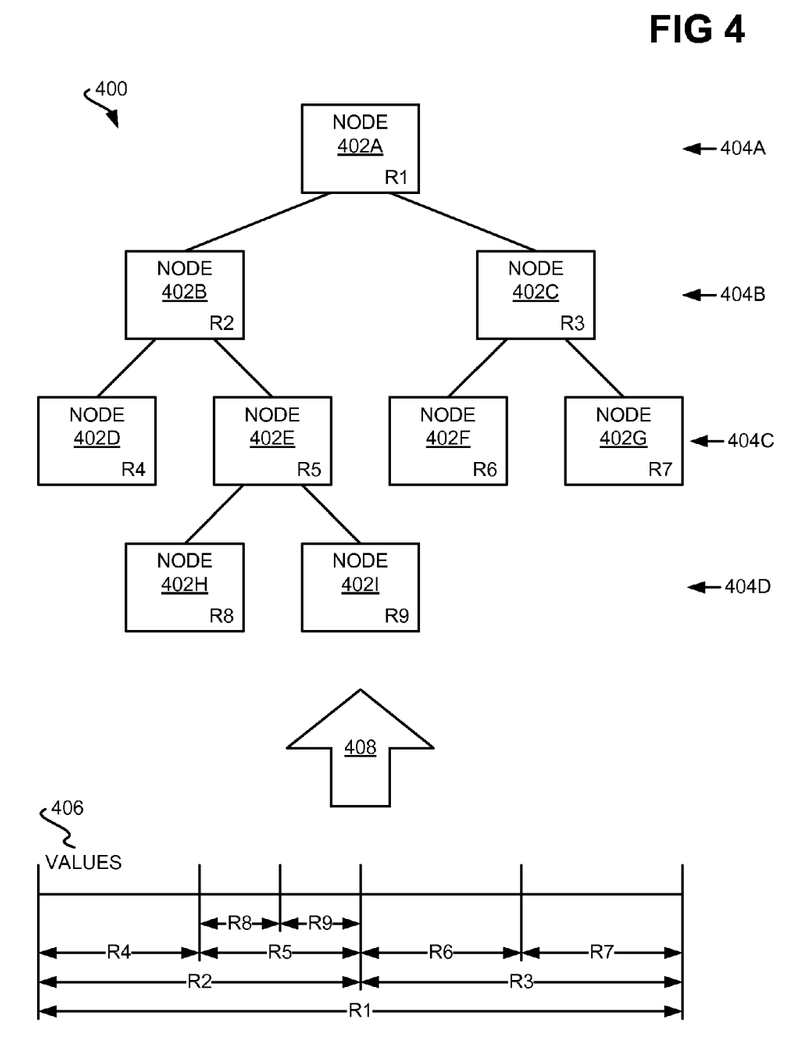
FIG. 4 is a diagram of an exemplary outlier detection data structure, according to an embodiment of the present disclosure.

FIG. 4 shows an exemplary outlier detection data structure 400, according to an embodiment of the disclosure. The outlier detection data structure 400 is specifically a tree. The tree includes a number of nodes 402A, 402B, 402C, 402D, 402E, 402F, 402G, 402H, and 402I, collectively referred to as the nodes 402. The nodes 402 are organized over a number of hierarchically organized levels 404A, 404B, 404C, and 404D, collectively referred to as the levels 404.

The node 402A is assigned to the first level 404A. Each node 402, except for the first node 402A, is assigned to one of the other levels 404B, 404C, and 404D, and has a parent node within a prior level. For example, the node 402B is assigned to the level 404B and has the parent node 402A within the prior level 404A. As another example, the node 402I is assigned to the level 404D and has the parent node 402E within the prior level 404C.

The tree corresponds to a given dimension for which data points have values. The values 406 that the data points can take on for the given dimension are represented as a range of values R1. The range R1 is in the example of FIG. 4 divided equally between the sub-ranges of values R2 and R3; that is, each sub-range R2 and R2 is equal to a different half of the range R1. The sub-range R2 is divided equally between the sub-ranges of values R4 and R4, and the sub-range R3 is divided equally between the sub-ranges of values R6 and R7. The sub-range R5 is divided equally between the sub-ranges of values R8 and R9 in the example of FIG. 4.

As indicated by the arrow 408, the ranges R1 through R9 are mapped to the nodes 402 of the tree. The first node 402A corresponds to the total range of values R1 that the data points can take on for the dimension to which the tree corresponds. The nodes 402B and 402C correspond to the sub-ranges R2 and R3, respectively. The nodes 402D, 402E, 402F, and 402G correspond to the sub-ranges R4, R5, R6, and R7, respectively. Finally, the nodes 402H and 402I correspond to the sub-ranges R8 and R9, respectively.

A data point is located within the node of each level that encompasses the value of the data point for the dimension to which the tree corresponds. For example, a data point may have a value within the sub-range R6. This means that the data point is located in the nodes 402A, 402C, and 402F. This is because the node 402F corresponds to the sub-range R6, the node 402C corresponds to the sub-range R3 of which the sub-range R6 is a part, and the node 402A corresponds to the total range R1 of which all the sub-ranges are a part. Each data point is thus located within the first node 402A of the first level 404A and that corresponds to the total range R1.

As another example, a data point may have a value within the sub-range R8. This means that the data point is located in the nodes 402A, 402B, 402E, and 402I. This is because the node 402I corresponds to the sub-range R8, the node 402E corresponds to the sub-range R5 of which the sub-range R8 is a part, the node 402B corresponds to the sub-range R2 of which the sub-range R5 is a part, and the node 402A includes the total range R1 of which all the sub-ranges are a part.

Each data point is thus located within the first node 402A of the first level 404A and that corresponds to the total range R1. Furthermore, for a given level 404, a data point can at most be located within just one node 402 of that level 404. In general, for a data point located within a given node 402 of a given level 404, the data point is also located within the parent node 402 of the prior art level 404. For example, a data point located within the node 402G of the level 404C also is located within the parent node 402C of the prior level 404B, and thus is located within the parent node 402A of the prior level 404A as well.

Referring back to FIG. 1, the outlier detection data structures corresponding to the dimensions for which the data points have values are updated in part 104 in one embodiment as follows. Each data structure is updated when a given new data point is to be added by adding the new data point to each node within each tree that encompasses the value of this new data point (106). For example, in the tree of FIG. 4, a new data point that has a value within the range R4 is added to the nodes 402A, 402B, and 402D. Furthermore, each data structure is updated when a given existing data point (i.e., an expiring data point) is to be removed by removing the existing data point from each node within each tree in which the existing data point is located (108). For example, in the tree of FIG. 4, an existing data point that has a value within the range R7 and thus is located within nodes 402A, 402C, and 402G is removed from all these nodes.

The outlier detection data structures are used to detect one or more outlier data points within the streaming window over selected one or more dimensions (110). For example, one query may request that the outlier data points for just one of the dimensions be returned. As another example, another query may request that the outlier data points for two of the dimensions be returned. As a third example, a third query may request that the outlier data points for all the dimensions be returned. Furthermore, for each dimension, a query can specify the level—i.e., the scale—at which outlier data points are detected in that dimension. For example, in the tree of FIG. 4, a data point may be an outlier in the level 404D but not in the level 404C.

In one embodiment, the outlier detection data structures are used to detect the outlier data points within the streaming window over selected dimensions by performing the following for each given data point within the streaming window (112). First, for each selected dimension, the neighbor data points for the given data point within a selected level of the tree for the dimension in question are determined (114). Where the query is concerned with detecting the outlier data points within two dimensions, for instance, part 114 is performed in relation to the tree for each of these two dimensions. The result of part 114 is a set of neighbor data points of the given data point, for each dimension. The set for any dimension can be the empty set, or NULL.

It is said that a given data point has neighbor data points if, for the selected level of the tree for the dimension in question, there are other data points within the same node as the given data point. Likewise, it is said that a given data point does not have any neighbor data points if, for the selected level of the tree for the dimension in question, there are no other data points within the node in which the given data point is located. Thus, if a given data point is the sole data point located within a node at the selected level of the tree for the dimension in question, then the data point does not have any neighbor data points at the selected level for the dimension in question. By comparison, if a given data point is not the sole data point located within a node at the selected level of the tree for the dimension in question, then the data point has neighbor data points at the selected level for the dimension in question—specifically the other data points located within this node.

A logical AND operation is performed on all the sets of neighbor data points that were determined in part 114 (116). For example, for a query concerned with detecting the outlier data points within two dimensions, the first set of neighbor data points may be the data points P1 and P2 for one of the dimensions, and the second set of neighbor data points may be the data point P3 for the other dimension. Performing a logical AND operation yields the empty set, because $\{P1, P2\} \cap \{P3\} = \{\emptyset\}$.

The given data point for which parts 114 and 116 has been performed is an outlier data point where the result of the logical AND operation is the empty set, or NULL (i.e., $\{\emptyset\}$) (118). In the example of the previous paragraph, this means that the given data point is indeed an outlier data point with respect to the two dimensions concerned. As noted above, parts 114, 116, and 118 are performed for each data point within the streaming window.

As another example, for the same query concerned with detecting the outlier data points within two dimensions but in relation to a different given data point, the first set of neighbor points may be the data points P1 and P2 for one dimension, and the second set of neighbor data points may be the data points P1 and P4 for the other dimension. Performing a logical AND operation yields the data point P1, because $\{P1, P2\} \cap \{P1, P4\} = \{P1\}$. Therefore, this means that the given data point is not an outlier data point with respect to the two dimensions concerned, because the logical AND operation did not yield the empty set, or NULL.

Figure 5A:
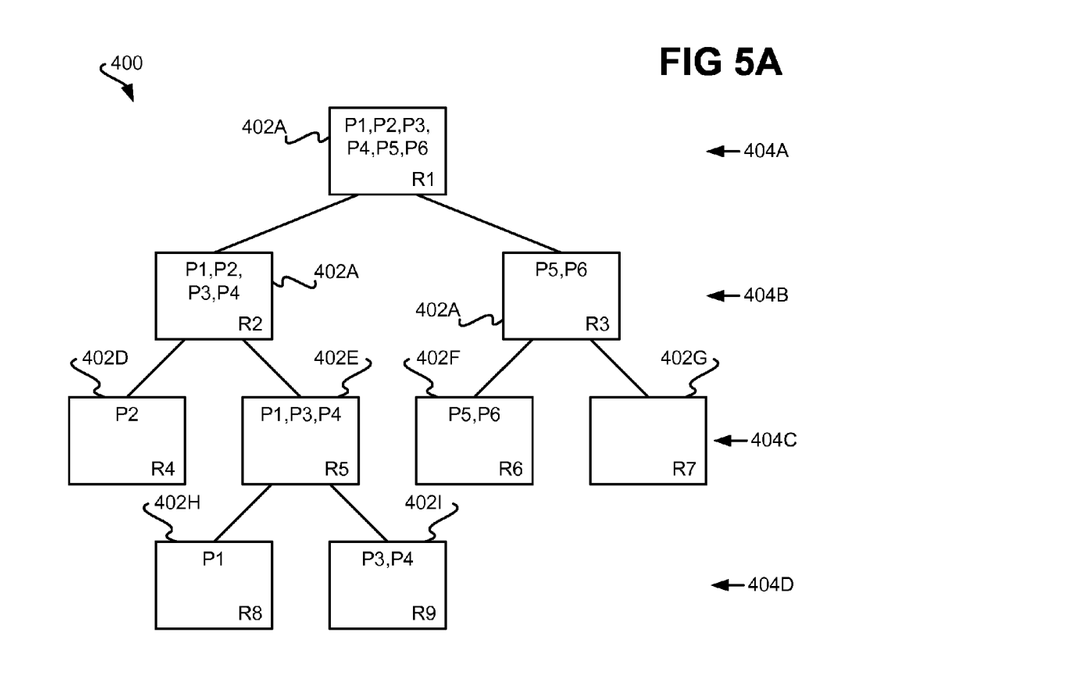
FIGS. 5A and 5B are diagrams of exemplary outlier detection data structures as populated with representative data points, according to an embodiment of the present disclosure.

Parts 114, 116, and 118 are now more thoroughly described with reference to FIGS. 5A and 5B, which depict outlier detection data structures 400 and 500 corresponding to two different dimensions, according to an embodiment of the disclosure. The outlier detection data structure 400 of FIG. 5A is the tree of FIG. 4 that has been described, in which six data points P1-P6 are located within the nodes 402 of the levels 404. Specifically, data points P1-P6 are located within the node 402A. Data points P1-P4 are located within the node 402B, and data points P5 and P6 are located within the node 402C. Data point P2 is located within the node 402D; data points P1, P3, and P4 are located within the node 402E; data points P5 and P6 are located within the node 402C; and no data points are located within the node 402G. Finally, data point P1 is located within the node 402H and data points P3 and P4 are located within the node 402I.

Figure 5B:
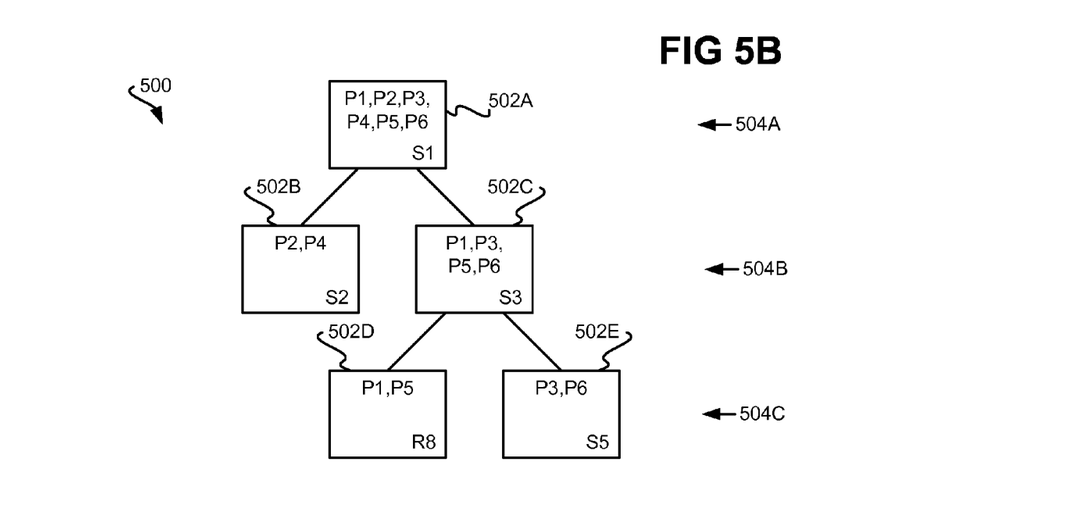

The outlier detection data structure 500 of FIG. 5B is also a tree. The tree of FIG. 5B has five nodes 502A, 502B, 502C, 502D, and 502E, collectively referred to as the nodes 502, which are organized over three levels 504A, 504B, and 504C, collectively referred to as the levels 504. The node 502A corresponds to a total range of values S1 that data points can take on for the dimension to which the outlier detection data structure 500 corresponds. The range S1 encompasses two sub-ranges S2 and S3, to which the nodes 502B and 502C correspond, respectively. The sub-range S3 encompasses two sub-ranges S4 and S5, to which the nodes 502D and 502E correspond, respectively.

The six data points P1-P6 are also located within the nodes 502 of the levels 504. Specifically, data points P1-P6 are located within the node 502A. Data points P2 and P4 are located within the node 502B, and data points P1, P3, P5, and P6 are located within the node 502C. Finally, data points P1 and P5 are located within the node 502D, and data points P3 and P6 are located within the node 502E. As such, data points P1 and P5 are located within the sub-range S4, and thus within the sub-range S3 and the range S1 as well. Data points P3 and P6 are located within the sub-range S5, and thus within the sub-range S3 and the range S1 as well. Points P2 and P4 are located within the sub-range S2 and thus within the range S1, too.

A data point is considered an outlier data point for a given dimension and at a given level if the data point does not have any neighbor data points within that dimension and at that level. That is, a data point has neighbor data points within a given range if other data points have values for the dimension within the same range in question (i.e., at the same level), and thus are located within the same node. By comparison, a data point does not have any neighbor data points within a given range if no other data points have values for the dimension within the same range (i.e., at the same level), and thus the data point is the only data point located within a given node at this range.

For example, in the tree of FIG. 5A, at the level 404D, data point P1 is an outlier data point for the dimension to which the outlier detection data structure 400 corresponds, because it is the sole occupant within the node 402H at the level 404D. However, at the level 404C, data point P1 is not an outlier data point for the dimension to which the outlier detection data structure 400 corresponds, because data point P1 shares the node 402H at the level 404D with data points P3 and P4. By comparison, at the level 404C, data point P2 is an outlier data point for the dimension to which the outlier detection data structure 400 corresponds, because data point P2 is the sole occupant within the node 402D at the level 404C.

Exemplary performance of parts 114, 116, and 118 of FIG. 1 for a particular query is now described in relation to FIGS. 5A and 5B. The particular query is to detect the outlier data points considering the dimension of FIG. 5A at the level 404C, and the dimension of FIG. 5B at the level 504B. As to data point P3, performing part 114 yields two sets of neighbor data points. The first set, for the dimension of FIG. 5A, includes data points P1 and P4, which are the neighbor data points of data point P3 at the level 404C, since data point P3 shares the node 402E at the level 404C with data points P1 and P4. The second set, for the dimension of FIG. 5B, includes data points P1, P5, and P6, since data point P3 shares the node 502C at the level 504B with data points P1, P5, and P6. The logical AND operation of these two sets of neighbor data points in part 116 yields just data point P1, because {P1, P4}∩{P1, P5, P6}={P1}. Therefore, in part 118 it is concluded that data point P3 is not an outlier for this query, since the data point P3 has the data point P1 as its neighbor.

As another example, a different query may be to detect the outlier data points consider the dimension of FIG. 5A at the level 404D, and the dimension of FIG. 5B at the level 504B. As to data point P3 again, performing part 114 yields two sets of neighbor data points. The first set, for the dimension of FIG. 5A, includes data point P4, which is the neighbor data point of data point P3 at the level 404D, since data point P3 shares the node 402I at the level 404D with data point P4. The second set, for the dimension of FIG. 5B, includes data points P1, P5, and P6, as before, since data point P3 shares the node 502C at the level 504B with data points P1, P5, and P6. The logical AND operation of these two sets of neighbor data points in part 116 yields the empty set, or NULL, because {P4}∩{P1, P5, P6}={Ø}. Therefore, in part 118 it is concluded that data point P3 is an outlier for this query.

The example of the previous paragraph illustrates that even if a given data point is not an outlier when considering just one dimension, the given data point can still be an outlier when considering more than one dimension. In the example of the previous paragraph, data point P3 is not an outlier at just the dimension of FIG. 5A at the level 404D, because it has a neighbor data point—data point P4—at the level 404D. Likewise, data point P3 is not an outlier at just the dimension of FIG. 5B at the level 504B, because it has neighbor data points—data points P1, P5, and P6—at the level 504B. However, when considering the dimension of FIG. 5A at the level 404D and the dimension of FIG. 5B at the level 504B, data point P3 is nevertheless an outlier data point.

Furthermore, it is noted that the outlier detection data structures, such as the trees of FIGS. 5A and 5B, are used to detect outlier data points within the streaming window over selected dimensions in that just the data structures corresponding to the selected dimensions are used, and not data structures corresponding to any other dimensions. For example, if just the outlier data points as to the dimension of FIG. 5A are to be detected, then just the tree of FIG. 5A is used, and the tree of FIG. 5B, which corresponds to a different dimension, is not used. As another example, if there are three dimensions, including the dimensions of FIGS. 5A and 5B, and if just the outlier data points as to the dimension that does not correspond to FIG. 5A or FIG. 5B are to be detected, then the trees of FIGS. 5A and 5B are not used.

Referring back to FIG. 1 one final time, once the outlier data points within the streaming window over selected one or more dimensions have been detected in part 110, these outlier data points, if any, are output (120). For example, the outlier data points and/or their values for the dimensions may be displayed on a display device for a user. As other examples, the outlier data points and/or their values for the dimensions may be stored on a computer-readable storage medium, or transmitted over a network, among other types of such output.

In the method 100, the outlier detection data structures are used to detect outlier data points within the streaming window by processing each point within the streaming window, pursuant to parts 112, 114, 116, and 118, each time a data point is added to or removed from the streaming window. However, in another embodiment, the outlier detection data structures can be more efficiently utilized to detect the outlier data points within the streaming window. When a query is first received, each data point within the streaming window is still evaluated to detect a set of outlier data points for the query, as has been described in relation to parts 112, 114, 116, and 118. Thereafter, however—as new data points are added to and expiring data points are removed from the streaming window and the outlier detection data structures in parts 102 and 104—just one or more particular data points within the streaming window are evaluated to update this set of outlier data points for the query. This is now described in detail.

Figure 6A:
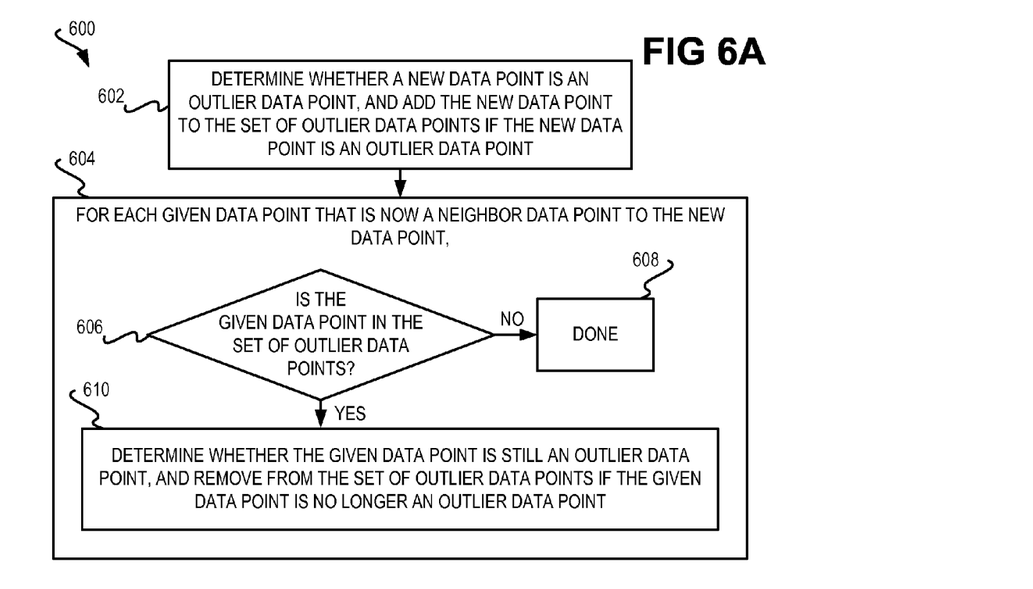
FIGS. 6A and 6B are flowcharts of methods for efficiently updating a set of outlier data points when a new data point is added to a streaming window and when an existing or expiring data point is removed from the streaming window, according to embodiments of the present disclosure.

FIG. 6A shows a method 600 that is performed after a new data point has been added to the streaming window and the outlier data structures have been updated, according to an embodiment of the disclosure. The method 600 is performed in lieu of part 110 of the method 100 of FIG. 1, after part 110 has been performed once to initially detect the set of outlier data points for a query. That is, when a query is first received, part 110 is performed. Thereafter, instead of part 110 being performed, the method 600 is performed after a new data point has been added to the streaming window in part 102 of the method 100 and to the outlier detection data structures in part 104 of the method 100.

It is determined whether the new data point is an outlier data point, and the new data point is added set of outlier data points if it is an outlier data point (602). Part 602 is performed by performing parts 114, 116, and 118 of the method 100 of FIG. 1. If it is concluded that the new data point is an outlier data point in part 118, then the new data point is added to the set of outlier data points.

Next, the following is performed for each given data point within the streaming window that is a neighbor data point to the new data point (604). If the given data point is not in the set of outlier data points (606), then the method 600 is finished as to this given data point (608). If the given data point is in the set of outlier data points (606), however, then it is determined whether the given data point is still an outlier data point, and the given data point is removed from the set of outlier data points if it is no longer an outlier data point (610). Part 610 is performed by performing parts 114, 116, and 118 of the method 100 of FIG. 1. If it is concluded that the given data point is not an outlier data point in part 118, then the given data point is removed from the set of outlier data points.

The method 600 leverages the insight that when a new data point has been added, any existing data point that was not an outlier data point before cannot be an outlier data point now. Furthermore, when a new data point is added, existing data points may no longer be outlier data points if they were previously. The existing data points that may no longer be outlier data points when a new data point is added are just the data points that are neighbor data points to the new data point. Thus, the particular data points that are processed in the method 600 to update the set of outlier data points are the new data point, and the existing data points that are now neighbor data points to the new data point. No other data points are processed in the method 600.

Figure 6B:
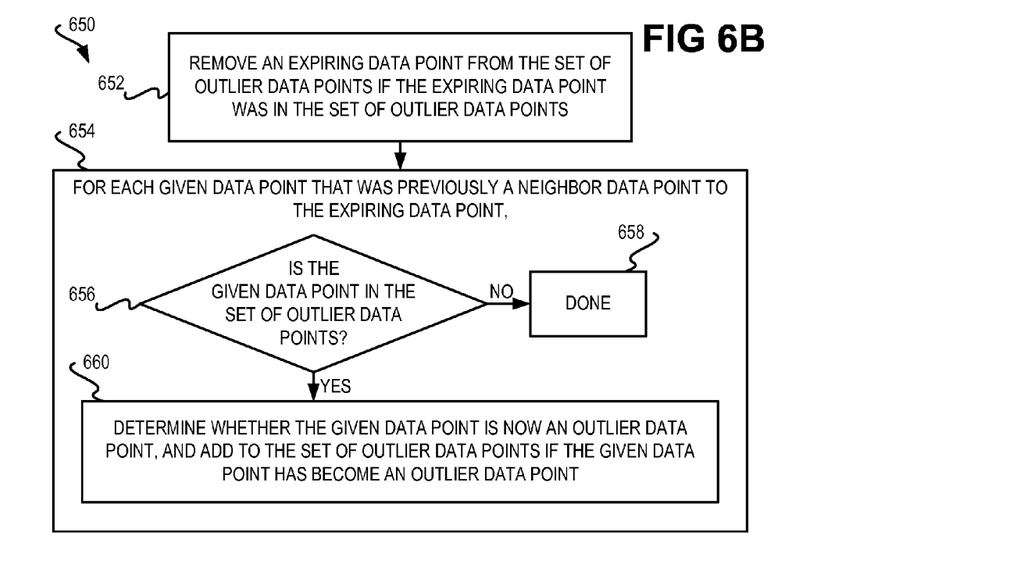

FIG. 6B shows a method 650 that is performed after an expiring data point has been removed from the streaming window and the outlier data structures have been updated, according to an embodiment of the disclosure. The method 650 is performed in lieu of part 110 of the method 100 of FIG. 1, after part 110 has been performed once to initially detect the set of outlier data points for a query. That is, when a query is first received, part 110 is performed. Thereafter, instead of part 110 being performed, the method 650 is performed after an expiring data point has been removed from the streaming window in part 102 of the method 100 and from the outlier detection data structures in part 104 of the method 100.

The expiring data point is removed from the set of outlier data points if the expiring data point was in the set of outlier data points (652). By definition, the expiring data point can no longer by an outlier data point, because it is no longer within the streaming window of data points.

Next, the following is performed for each given data point within the streaming window that was previously a neighbor data point to the expiring data point prior to the removal of the expiring data point from the streaming window (654). If the given data point is in the set of outlier data points already (656), then the method 650 is finished as to this given data point (658). If the given data point is not already in the set of outlier data points (656), however, then it is determined whether the given data point is now an outlier data point, and the given data point is added to the set of outlier data points if it is now an outlier data point (660). Part 660 is performed by performing parts 114, 116, and 118 of the method 100 of FIG. 1. If it is concluded that the given data point is an outlier data point in part 118, then the given data point is added to the set of outlier data points.

The method 650 leverages the insight that when a new data point has been added, any existing data point that was an outlier data point before still has to be an outlier data point. Furthermore, when an expiring data point is removed, existing data points may now be outlier data points if they were not previously. The existing data points that may now be outlier data points when an expiring data point is removed are just the data points that were neighbor data points to the expiring data point prior to the removal of the expiring data point. Thus, the particular data points that are processed in the method 650 to update the set of outlier data points are the expiring data point, and the data points that were previously neighbor data points to the expiring data point prior to the removal of the expiring data point. No other data points are processed in the method 650.

The methods 600 and 650 of FIGS. 6A and 6B therefore provide a more efficient way to update a set of outlier data points for a query. When the query is first received, part 110 of the method 100 of FIG. 1 is performed. Thereafter, the method 600 is performed after a new data point is added in parts 102 and 104 of the method 100, and the method 650 is performed after an existing data point is removed in parts 102 and 104, in lieu of performing part 110. It is noted in this respect that part 104 is still performed after a new data point has been added to or an existing data point has been removed from the streaming window in part 102, so that the outlier detection data structures are updated prior to the method 600 or the method 650 being performed.

Furthermore, in one special case, a query may be received prior to the streaming window containing any data points. In this case, the set of outlier data points for the query is initially the empty set, or NULL. If the streaming window can contain up to x data points, as data points are added to the streaming window, no data points are removed from the streaming window until the streaming window already contains x data points. Each time a new data point is added to the streaming window and to the outlier detection data structures in parts 102 and 104 of the method 100 of FIG. 1, the method 600 is performed. Each time an existing (i.e., expiring) data point is removed from the streaming window and from the outlier detection data structures in parts 102 and 104, the method 650 is performed. Part 110 of the method 100 is thus not performed in this special case.

Figure 7:
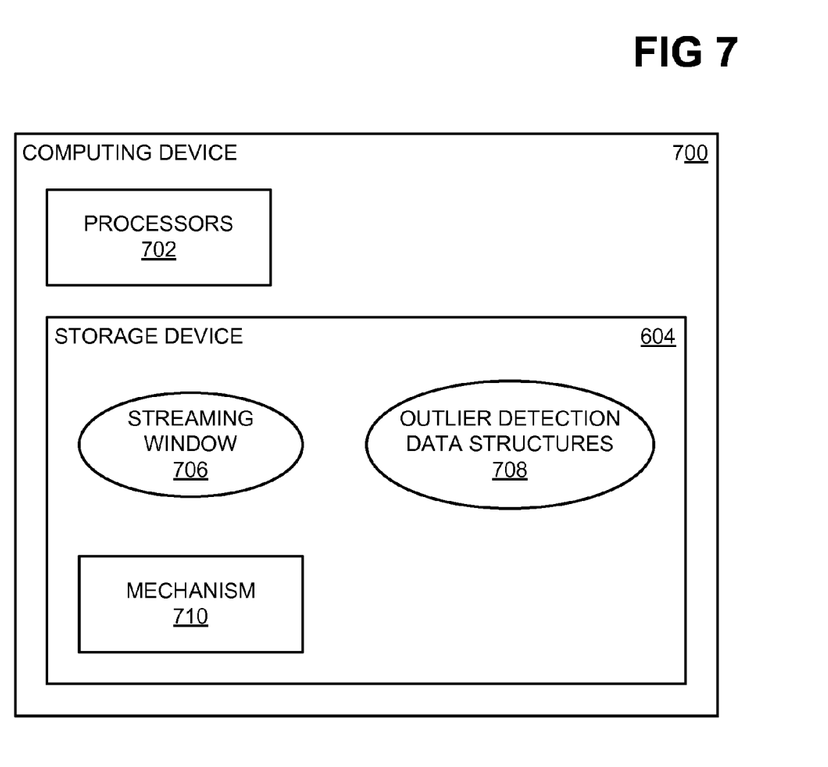
FIG. 7 is a diagram of a rudimentary computing device, according to an embodiment of the disclosure.

In conclusion, FIG. 7 shows a rudimentary computing device 700, according to an embodiment of the disclosure. The computing device 700 includes one or more processors 702 and a storage device 704. The computing device 700 can and typically will include other components, such as other hardware, in addition to the processors 702 and the storage device 704. The storage device 704 can be or include volatile storage, such as dynamic random access memory, as well as non-volatile storage, such as hard disk drives. The storage device 704 is also considered a computer-readable storage medium.

The storage device 704 stores data representing a streaming window of data points 706 and one or more outlier detection data structures 708. As to the former, the storage device 704 may not store the entire streaming window 706, but may just store each new data point that is to be added to the streaming window 706 as the computing device 700 receives each new data point. Once the outlier data structures 708 have been updated to add a new data point, the new data point may no longer be stored by the storage device 704. In this way, the storage device 704 does not have to store all the data points of the streaming window 706 at any given time. The data points may be received by sensors that are part of or external to the computing device 700 in one embodiment. The storage device 704 may in one embodiment also store the set of outlier data points for a given query, where this set is updated as data points are added to or removed from the streaming window 706.

The storage device 704 is also said to store a mechanism 710, which can be computer code and thus stored on a computer-readable storage medium like the storage device 704. The computer code is executed by the processors 702, and in this respect is considered to be implemented by the processors 702. Execution of the computer code by the processors 702 results in the performance of one or more methods, such as the method 100 of FIG. 1 and the methods 600 and 650 of FIGS. 6A and 6B that have been described. In this respect, the mechanism 710 is to update the outlier detection data structures 708, and is to use the data structures 708 to detect one or more outlier data points within the streaming window 706, as has been described.

We claim:

1. A method comprising:
as new data points are added to a predefined streaming window of data points and as existing data points are removed from the streaming window, the streaming window being a temporal streaming window, each data point having a value for each dimension of a plurality of dimensions, each data point corresponding to a real world event of a same type, each dimension corresponding to a different real world property or characteristic related to the same type of the real world events to which the data points correspond,
each time a given new data point is added to the streaming window or a given existing data point is removed from the streaming window,
updating, by a processor of a computing device, a plurality of detection data structures without determining distances among the data points, each outlier detection data structure encompassing the data points within the streaming window for one corresponding dimension of the plurality of dimensions as opposed to for a combination of more than one corresponding dimension of the plurality of dimensions; and,
using the outlier detection data structures to detect one or more outlier data points within the streaming window over selected one or more dimensions of the plurality of dimensions without determining distances among the data points, the outlier data points corresponding to real world events of particular interest.

2. The method of claim 1, wherein the outlier detection data structures are used to detect the outlier data points within the streaming window without regards to a number or identity of the selected dimensions.

3. The method of claim 1, wherein updating the outlier detection data structures comprises:
for the given new data point that has been added to the streaming window, adding the given new data point to each outlier detection data structure; and,
for the given existing data point that has been removed from the streaming window, removing the given existing data point from each outlier detection data structure.

4. The method of claim 1, wherein using the outlier detection data structures to detect the outlier data points within the streaming window over the selected dimensions comprises using just the outlier detection data structures corresponding to the selected dimensions.

5. The method of claim 1, using the outlier detection data structures to detect the outlier data points within the streaming window over the selected dimensions comprises:
for each given data point within the streaming window,
for each selected dimension, determining neighbor data points for the given data point within the outlier detection data structure for the selected dimension;
performing, by the processor of the computing device, a logical AND operation on the neighbor data points for the given data point within the outlier detection data structure determined for each selected dimension; and,
concluding that the given data point is an outlier where performance of the logical AND operation results in NULL.

6. The method of claim 1, wherein using the outlier detection data structures to detect the outlier data points within the streaming window over the selected dimensions comprises, when a given new data point of the new data points has been added to the streaming window:
where the given new data point is an outlier data point, adding the given new data point to a set of the outlier data points;
for each given data point within the streaming window that is a neighbor data point to the given new data point,
where the given data point is in the set of the outlier data points, removing the given data point from the set of the outlier data points where the given data point is no longer an outlier data point due to the given new data point having been added to the streaming window,
wherein other data points within the streaming window, besides the given new data point and each given data point that is a neighbor data point to the given new data point, are not processed when the given new data point is added to the streaming window.

7. The method of claim 1, wherein using the outlier detection data structures to detect the outlier data points within the streaming window over the selected dimensions comprises, when the given existing data point has been removed from the streaming window:
where the given existing data point was an outlier data point, removing the given existing data point from a set of the outlier data points;
for each given data point within the streaming window that was a neighbor data point to the given existing data point,
where the given data point is not in the set of outlier data points, adding the given data point to the set of the outlier data points where the given data point is now an outlier data point due to the existing data point having been removed from the streaming window,
wherein other data points within the streaming window, besides the given existing data point and each given data point that was a neighbor data point to the given existing data point, are not processed when the given existing data point is removed from the streaming window.

8. The method of claim 1, wherein each outlier detection data structure is a tree comprising:
a plurality of hierarchically organized levels including a first level and one or more additional levels; and,
a plurality of nodes including a first node and a plurality of additional nodes, the first node assigned to the first level, each additional node assigned to one of the additional levels, each additional node having a parent node within a prior level;

wherein the first node corresponds to a total range of values of the corresponding dimension of the outlier detection data structure, wherein each additional node corresponds to a sub-range of values of a range of values of the parent node of the additional node within the prior level, and wherein each data point within the streaming window is located within a node of each level that encompasses the value of the data point for the dimension of the outlier detection data structure.

9. The method of claim 8, wherein a number of additional nodes in each level is equal to twice a number of nodes in the prior level, such that the sub-range of values of to which each additional node corresponds is equal to half the range of values of the parent node of the additional node within the prior level.

10. The method of claim 8, wherein updating the outlier detection data structures comprises:

for the given new data point that has been added to the streaming window, adding the given new data point to each node of each tree that encompasses the value of the given new data point; and, for the given existing data point that has been removed from the streaming window, removing the given existing data point from each node within each tree within which the given existing data point is located.

11. The method of claim 8, using the outlier detection data structures to detect the outlier data points within the streaming window over the selected dimensions comprises using the outlier detection data structures to detect the outlier data points within the streaming window over the selected dimensions and for a selected level of the tree for each selected dimension.

12. The method of claim 8, using the outlier detection data structures to detect the outlier data points within the streaming window over the selected dimensions comprises:

for each given data point within the streaming window, for each selected dimension, determining neighbor data points for the given data point within a selected level of the tree for the selected dimension;

performing a logical AND operation on the neighbor data points for the given data point within the selected level of the tree determined for each selected dimension; and, concluding that the given data point is an outlier where performance of the logical AND operation results in NULL.

13. The method of claim 12, wherein determining the neighbor data points for the given data point within the selected level of the tree for the selected dimension comprises locating any points within a same node of the selected level of the tree for the selected dimension that includes the given data point.

14. A computer-readable storage medium having computer code stored thereon for execution by one or more processors, wherein execution of the computer code by the processors causes a method to be performed, the method comprising:

as new data points are added to a predefined streaming window of data points and as existing data points are removed from the streaming window, the streaming window being a temporal streaming window, each data point having a value for each dimension of a plurality of dimensions, each data point corresponding to a real world event of a same type, each dimension corresponding to a different real world property or characteristic related to the same type of the real world events to which the data points correspond, each time a given new data point is added to the streaming window or a given existing data point is removed from the streaming window, updating a plurality of detection data structures without determining distances among the data points, each outlier detection data structure encompassing the data points within the streaming window for one corresponding dimension of the plurality of dimensions as opposed to for a combination of more than one corresponding dimension of the plurality of dimensions; and, using the outlier detection data structures to detect one or more outlier data points within the streaming window over selected one or more dimensions of the plurality of dimensions without determining distances among the data points, the outlier data points corresponding to real world events of particular interest.

15. A computing device comprising:

a processor;

a storage device to store:

at least one data point of a predefined streaming window of data points, the streaming window being a temporal streaming window, where over time new data points are added to the streaming window and existing data points are removed from the streaming window, each data point having a value for each dimension of a plurality of dimensions, each data point corresponding to a real world event of a same type, each dimension corresponding to a different real world property or characteristic related to the same type of the real world events to which the data points correspond;

a plurality of outlier detection data structures, each outlier detection data structure encompassing the data points within the streaming window for one corresponding dimension of the plurality of dimensions as opposed to for a combination of more than one corresponding dimension of the plurality of dimensions;

a mechanism implemented at least by the processor to:

update the outlier detection data structures each time a given new data point is added to the streaming window or a given existing data point is removed from the streaming window without determining distances among the data points; and, use the outlier detection data structures to detect one or more outlier data points within the streaming window over selected one or more dimensions of the plurality of dimensions without determining distances among the data points, the outlier data points corresponding to real world events of particular interest.

* * * * *

UNITED STATES PATENT AND TRADEMARK OFFICE
CERTIFICATE OF CORRECTION

PATENT NO. : 9,195,713 B2  
APPLICATION NO. : 12/614432  
DATED : November 24, 2015  
INVENTOR(S) : Gupta et al.

Page 1 of 1

It is certified that error appears in the above-identified patent and that said Letters Patent is hereby corrected as shown below:

In The Drawings:

In sheet 4 of 6, Fig 5B, reference numeral 502D, line 2, delete "R8" and insert -- S4 --, therefor.

Signed and Sealed this  
Twenty-second Day of March, 2016

Michelle K. Lee  
*Director of the United States Patent and Trademark Office*